United States Patent [19]

Almering et al.

[11] Patent Number: 4,709,158
[45] Date of Patent: Nov. 24, 1987

[54] ARRANGEMENT FOR RESTORING THE L.F. CONTENT OF A DIGITAL SIGNAL

[75] Inventors: Petrus C. M. Almering; Bocke Zwaga, both of Hilversum, Netherlands

[73] Assignee: U.S. Philips Corporation, New York, N.Y.

[21] Appl. No.: 40,699

[22] Filed: Apr. 20, 1987

Related U.S. Application Data

[63] Continuation of Ser. No. 670,248, Nov. 9, 1984.

[30] Foreign Application Priority Data

Nov. 15, 1983 [NL] Netherlands ............ 8303907

[51] Int. Cl.$^4$ .................. H03K 5/01; H03B 1/00
[52] U.S. Cl. .................. 307/200 A; 307/565; 307/540; 307/443; 307/268; 307/271; 328/114; 328/162; 371/4; 375/113; 333/17 R

[58] Field of Search .............. 307/479, 475, 565, 540, 542, 544, 307/271, 268, 200 A, 443; 328/162, 114, 53; 375/113, 76; 371/4, 7; 333/17

[56] References Cited

U.S. PATENT DOCUMENTS

| | | | |
|---|---|---|---|
| 2,999,173 | 9/1961 | Ruck ........................... | 307/565 |
| 3,457,508 | 7/1969 | Rowlands et al. ............ | 375/3 |
| 3,497,723 | 4/1967 | Nelson ....................... | 307/544 |
| 3,986,053 | 10/1976 | Poemer ...................... | 375/4 |
| 4,462,008 | 7/1984 | Katakura .................... | 333/14 |

Primary Examiner—Stanley D. Miller
Assistant Examiner—Richard Roseen
Attorney, Agent, or Firm—Thomas A. Briody; Jack Oisher; William J. Streeter

[57] ABSTRACT

The invention relates to an arrangement for restoring the L.F. content of a digital signal which has been conveyed through a high-pass filter. This is realized with the aid of a center clipper which is connected to the output of the filter. The restored digital signal can be taken from the output of the center clipper.

3 Claims, 3 Drawing Figures

ARRANGEMENT FOR RESTORING THE L.F. CONTENT OF A DIGITAL SIGNAL

This application is a continuation of application Ser. No. 670,248, filed Nov. 9, 1984.

The invention relates to an filter having a high-pass characteristic, to whose input a digital signal is applied and which has an output.

In fault locating arrangements for line transmission systems, use is frequently made of a fault-locating testing apparatus. In the terminal station performing the test this apparatus is connected to the line to be tested. The measuring apparatus supplies a so-called triplet test signal. Such a test signal is formed by three logic ones (triplet) followed by an adjustable number of logic zeros from 0 to a maximum of 13. The low-frequency repetition rate of such a triplet test signal can thus be adjusted in eighteen steps. Because of this low-frequency repetition rate, the test signal contains a strong low-frequency spectrum component. The operation of the fault locating arrangement is based on this spectrum component. The output stage of a repeater in said line transmission system usually comprises an output transformer to which the continuing transmission line is connected. In practice, such an output transformer operates as a high-pass filter. This filter action significantly affects the low-frequency spectrum component of the ideal triplet signal. This signifies that the output signal of the repeater is not suitable, without further measures, to determine the magnitude of the low-frequency spectrum component of the ideal triplet signal.

A possible solution for the above-mentioned problem is the use of a separate output stage for coupling out the triplet signal. However, this solution requires many additional components, such as a low-frequency transformer which is expensive and bulky.

The invention has for its object to provide a different solution which does not have the above-mentioned disadvantage and is characterized in that the output of the high-pass filter is connected to the output of the arrangement through a center clipper.

The invention will now be described by way of example with reference to the accompanying drawing.

DESCRIPTION OF THE PREFERRED EMBODIMENT

Figure 1:
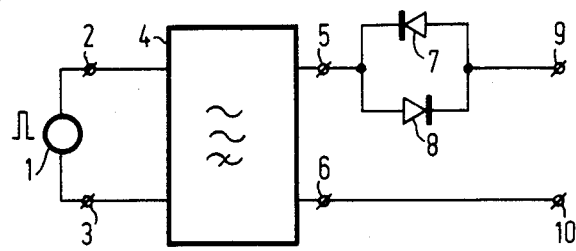
FIG. 1 shows the principle of the invention.

In FIG. 1, reference numeral 1 denotes a digital voltage source connected to the inputs 2 and 3 of a high-pass filter 4. The output 5 of the high-pass filter is connected to the output terminal 9 of the arrangement through a center clipper which is formed by the diodes 7 and 8. The output 6 of the high-pass filter is connected to the output terminal 10 of the arrangement.

Figure 2:
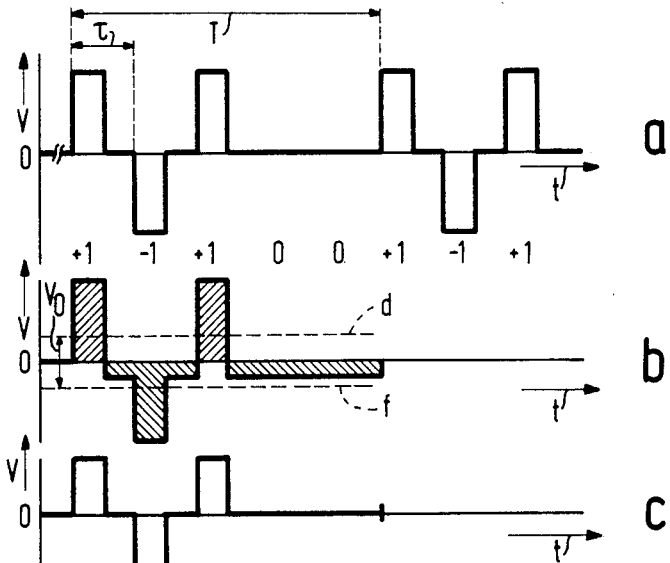
FIG. 2 shows a time diagram of a triplet test signal.

FIG. 2a shows a so-called triplet test signal such as is used for detecting faulty or poorly operating repeaters in line transmission systems. The test signal is formed by three ones, followed by an adjustable number of zeros. The triplets shown in the Figure are denoted plus-triplets, as each triplet has one additional positive pulse. The signal may also be inverted, the triplets then being denoted as minus-triplets. The repetition rate of the triplets is specified as the density of the triplet signal. The repetition rate depends on the number of zeros. The density is expressed in the number of triplets (always one) relative to the number of time slots which make up one period T. A density of $\frac{1}{3}$ means 1 triplet for 3 time slots, i.e. no zeros. A density of 1/16 means 1 triplet for 16 time slots, i.e. 13 zeros.

If now such a triplet test signal is passed through the high-pass filter 4, then a signal as shown schematically in FIG. 2b will appear at the output (5, 6) of the high-pass filter 4. The low-frequency spectrum components of the signal have been suppressed. This signifies that the hatched area above the zero line is equal to the hatched area below the zero line. When the signal shown in FIG. 2b is passed through the center clipper formed by the diodes 7 and 8 a signal having a shape as shown in FIG. 2c will appear at the output (9, 10) of the arrangement. The portion located between the lines d and f is clipped from the signal of FIG. 2b with the aid of this center clipper. A signal illustrated by FIG. 2c now occurs at the output (9, 10). A comparison between the FIGS 2a and 2c shows that the two signal shapes are identical. This means that the original spectrum content of the signal shown in FIG. 2a, that is to say the mutual amplitude and phase relationship of the spectrum components have been restored. The foregoing applies only as long as the zero line shift of the output signal of the high-pass filter 4 is less than one diode voltage. If the said zero line shift exceeds one diode voltage then series arrangements of two or more diodes can be used instead of the diode 7 and the diode 8.

Figure 3:
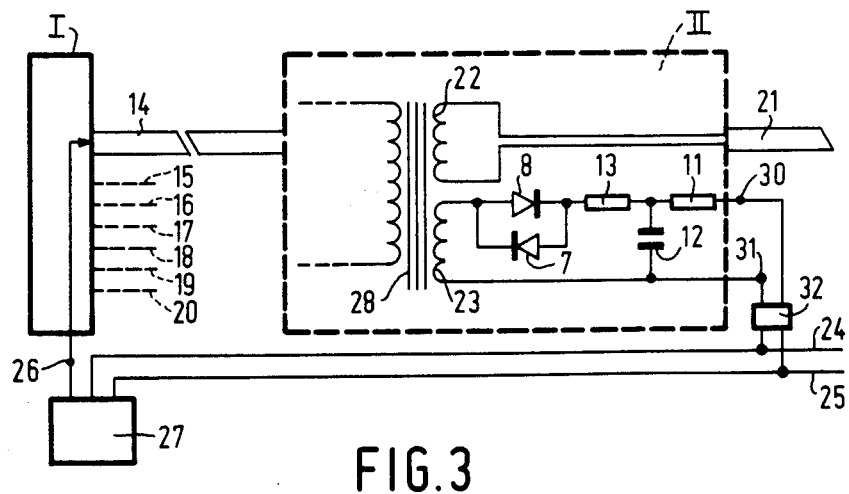
FIG. 3 shows one use of the invention in a fault-locating system.

FIG. 3 shows a practical embodiment in a fault-locating system for line transmission. The terminal station I is connected to a second terminal station, not shown, through a transmission line 14, a repeater II and a further transmission line 21. In addition, further transmission lines 15 to 20 in which repeaters are incorporated are arranged between the two terminal stations. Each repeater comprises an output transformer 28. The secondary winding 22 is connected to the continuing transmission line 21 of the line transmission system. The secondary winding 23 is connected through the center clipper formed by the diodes 7 and 8 to the input of a low-pass filter formed by the resistors 11 and 13 and the capacitor 12. The outputs 30 and 31 are connected to the conductors 25 and 24, respectively. The conductors 24 and 25 are connected to the measuring apparatus 27. The output 26 is connected to, for example, the line 14. A triplet test signal having the shape shown in FIG. 2a is supplied from the output 26. This test signal reaches the repeater II through the transmission line 14. The triplet signal is now adjusted to the lowest density and the low-frequency spectrum component in the triplet signal and is adjusted to the pass frequency of the filter 32. The level of the L.F. spectrum component of the triplet signal at the output of the repeater II is now measured through the coil-loaded line (24, 25). If no level, or a very low level, is measured, then this is an indication that this repeater II does not operate properly. To reach this conclusion the level for a properly operating repeater must be known. This signifies that there must be a level administration.

If the measurement indicates a good level, the repeater II can be tested further by increasing the density of the triplet signal. When the density is increased, the change in the level of the L.F. spectrum component must be identical to the anticipated level change which is known for a properly operating repeater. Because of the increase of the density the "margin" space at the decision point of the repeater is reduced.

Thus, there is described one embodiment of the invention. Those skilled in the art will recognize yet other embodiments described by the claims which follow.

What is claimed is:

1. In a system for locating faults in a transmission line having a repeater, said repeater including:
    a transformer with a primary winding connection to receive a digital triplet test signal or an information signal;
    a first secondary winding for coupling said information signal to a transmission line;
    a second secondary winding serving as a high pass filter to said test signal;
    a circuit for restoring low frequency signal components to said triplet test signal comprising:
    a center clipper connected to said second secondary winding; and
    a low pass filter connected to said center clipper providing a restored triplet test signal indicative of said repeater performance.

2. The arrangement of claim 1 wherein said center clipper includes first and second parallel connected branches, each branch including a series of diodes connected to conduct current in opposite directions.

3. An arrangement as claimed in claim 1, wherein the center clipper is formed by two oppositely poled diodes in parallel.

* * * * *